United States Patent [19]

Barth et al.

[11] 3,944,508

[45] Mar. 16, 1976

[54] THERMOPLASTIC MIXTURES SUITABLE FOR FOAMING IN THE EXTRUSION OR INJECTION MOLDING PROCESS

[75] Inventors: Hans-Jochen Barth, Emmerting; Herbert Reinecke, Burghausen; Georg Hollenbach, Burghausen; Eduard Kurz, Burghausen, all of Germany

[73] Assignee: Wacker Chemie GmbH, Munich, Germany

[22] Filed: May 21, 1974

[21] Appl. No.: 471,870

Related U.S. Application Data

[63] Continuation of Ser. No. 283,253, Aug. 23, 1972, abandoned.

[30] Foreign Application Priority Data

Aug. 30, 1971 Germany............................ 2143377

[52] U.S. Cl.......... 260/2.5 R; 260/2.5 E; 260/2.5 P; 260/2.5 H; 260/2.5 HA; 260/23 XA; 260/28.5 D; 260/29.1 SB; 260/42.49; 260/45.75 J; 260/45.75 V; 260/876 R; 260/891; 260/897 C; 260/898; 260/899; 264/54
[51] Int. Cl.$^2$....................... C08J 9/10; C08L 27/06
[58] Field of Search............. 260/2.5 E, 2.5 R, 899, 260/92.8 W, 876 R, 897 C

[56] References Cited

UNITED STATES PATENTS

| | | | |
|---|---|---|---|
| 3,595,848 | 7/1971 | Reinecke et al. | 260/92.8 W |
| 3,706,679 | 12/1972 | Hopton et al. | 260/2.5 E |
| 3,766,106 | 10/1973 | Yurimoto et al. | 260/899 |

*Primary Examiner*—Wilbert J. Briggs, Sr.
*Attorney, Agent, or Firm*—Hammond & Littell

[57] ABSTRACT

Thermoplastic mixtures suitable for foaming in the extrusion or injection molding process consisting of polymerizate mixtures of (A) from 50 to 95% by weight of a vinyl chloride polymerizate prepared by free-radical polymerization selected from the group consisting of (1) bulk polymerization and (2) emulsion and suspension polymerization with continuous agitation, of vinyl chloride containing up to 20% by weight of ethylenically-unsaturated monomers copolymerizable with vinyl chloride and (B) from 5 to 50% by weight of a vinyl chloride polymerizate prepared by polymerization of a stable, aqueous monomeric dispersion of vinyl chloride containing up to 20% by weight of ethylenically-unsaturated monomers copolymerizable with vinyl chloride prehomogenized in the presence of emulsifiers and oil-soluble catalysts, and a foaming agent.

5 Claims, No Drawings

THERMOPLASTIC MIXTURES SUITABLE FOR FOAMING IN THE EXTRUSION OR INJECTION MOLDING PROCESS

Prior Application

This is a continuation of Ser. No. 283,253, filed Aug. 23, 1972, and now abandoned.

THE PRIOR ART

It is known to produce structural foam parts from foamable polyvinyl chloride by extrusion or injection molding processes, said structural foam partly having low density, evenly distributed and small pores, adjustable density of the outer skin, and good physical properties. These properties are of particular interest for the fault-free production of walls having variable thicknesses and for the production of parts with great wall thicknesses. In addition, foamed parts from polyvinyl chloride foam are economical because of their low material consumption.

Heretofore, polyvinyl chloride produced according to the suspension, emulsion or bulk polymerization methods has been used as a starting material. During the processing of these polymers at elevated temperatures, the melt frequently flows poorly in the processing machines and during the injection into the tools or nozzles. This causes deposits and burns. Furthermore, gas is lost by the breakdown of pores and a relatively high density of the end product is obtained.

Attempts have been made to avoid these disadvantages by the use of high doses of external lubricants. This, however, has an adverse effect on the physical properties of the melt; the cell walls break easier, and likewise parts with a too high density are obtained.

It was also found in addition that the melt is frequently not uniformly plasticized on its way through the processing machines. The expanding or foaming agent thus decomposes partly while powdered unmolten material is still present. This causes gas losses through the hopper, and likewise parts of high density are obtained. Furthermore, the melt is frequently not sufficient elastic and viscous in many cases. For this reason, pores cannot be formed, because of the poor elasticity of the cell walls, or they can form only under high gas pressures. On the other hand, if the viscosity of the melt is too low, the pores break up and parts are obtained with bubbles and high density. Sometimes the foam collapses even before the cell structure is fixed by cooling.

Previously, in order to avoid these disadvantages, polyvinyl chloride copolymers were used instead of polyvinyl chloride homopolymers. Alkyl acrylates, alkyl methacrylates, alkyl vinyl ethers, acrylonitrile, fumaric acid esters, maleic acid esters, chlorofumaric acid esters, chloromaleic acid esters, vinyl esters, such as vinyl acetate, vinylidene chloride, are all used as comonomers. The products made therefrom do not show yet fully satisfactory properties, and the densities after foaming are frequently still too high.

In addition, it was attempted to reduce the above-mentioned disadvantages by adding to polyvinyl chloride other polymers, for example, ethylene-vinyl acetate copolymers, methacrylic acid ester-butadiene-styrene terpolymers, acrylonitrile-butadiene-styrene terpolymers, chlorinated polyethylenes, polyethylenes, polypropylenes and polystyrenes. It was found, however, that even with these additions, products of high density, irregular pores, partly with bubbles and thus with unfavorable physical properties, for example, with low modulus of elasticity, low bending, tensile and compressive strength, and frequently with a rough and not evenly closed surface were formed.

OBJECTS OF THE INVENTION

An object of the present invention is the development of thermoplastic mixtures based on vinyl chloride which are suitable for foaming and avoid the above-mentioned drawbacks.

Another object of the present invention is the development of thermoplastic mixtures suitable for foaming in the extrusion or injection molding process consisting of polymerizate mixtures of (A) from 50 to 95% by weight of a vinyl chloride polymerizate prepared by free-radical polymerization selected from the group consisting of (1) bulk polymerization and (2) emulsion and suspension polymerization with continuous agitation, of vinyl chloride containing up to 20% by weight of ethylenically-unsaturated monomers copolymerizable with vinyl chloride and (B) from 5 to 50% by weight of vinyl chloride polymerizate prepared by polymerization of a stable, aqueous monomeric dipersion of vinyl chloride containing up to 20% by weight of ethylenically-unsaturated monomers copolymerizable with vinyl chloride prehomogenized in the presence of emulsifiers and oil soluble catalysts, and a foaming agent.

These and other objects of the invention will become more apparent as the description thereof proceeds.

DESCRIPTION OF THE INVENTION

It has now been found that the above objects can be achieved and the drawbacks overcome by replacing from 5 to 50% by weight of the conventional vinyl chloride polymerizate in a foamable composition by a vinyl chloride polymerizate produced by polymerization of a stable aqueous monomeric dispersion of vinyl chloride prehomogenized in the presence of emulsifiers and oil-soluble catalysts. More particularly, the invention relates to thermoplastic mixtures suitable for foaming in the extrusion or injection molding process consisting of polymerizate mixtures of (A) from 50 to 95% by weight of a vinyl chloride polymerizate prepared by free-radical polymerization selected from the group consisting of (1) bulk polymerization and (2) emulsion and suspension polymerizations with continuous agitation, of vinyl chloride containing up to 20% by weight of ethylenically-unsaturated monomers copolymerizable with vinyl chloride and (B) from 5 to 50% by weight of a vinyl chloride polymerizate prepared by polymerization of a stable, aqueous monomeric dispersion of vinyl chloride containing up to 20% by weight of ethylenically-unsaturated monomers copolymerizable with vinyl chloride prehomogenized in the presence of emulsifiers and oil-soluble catalysts, and a foaming agent.

Surprisingly, it was found that the addition of the polyvinyl chloride, produced according to the prehomogenized special method (component B) to a polyvinyl chloride produced according to the conventional methods (component A), yields a mixture whose melt has advantageous rheological properties with regard to the formation of pores and maintenance of the pore structure. The melt has a good external lubricating effect and thus does not stick to the hot metal parts during the processing. A breakup of the pores and destruction of the form structure are thus avoided. Another advantage is that the plasticization of the melt in the worm takes place very rapidly, and therefore the gas losses are kept very low. In addition the molded bodies produced from the material of the invention show a high surface gloss.

Component A is produced according to the known procedures of the suspension, emulsion and bulk polymerization methods. Comonomers which are copolymerizable with vinyl chloride, such as vinyl halides, for example, vinylidene chloride, vinyl fluoride; vinyl esters, e.g., alkanoic acid esters such as vinyl acetate, vinyl propionate, vinyl butyrate, vinyl 2-ethyl hexanoate, vinyl "Versatate"; vinyl ethers; acrylic, methacrylic, fumaric and maleic acids and their mono- or diesters of mono- or dialkanols with 1 to 10 carbon atoms and α-olefins, such as ethylene, propylene, butylene, can be copolymerized with the vinyl chloride in amounts up to 20% by weight. The K-values of the polyvinyl chlorides utilized are mostly between 55 and 70.

Component B is a polyvinyl chloride produced according to a special method. Vinyl chloride is here likewise homogenized, if necessary, together with the above-mentioned comonomers, in the aqueous phase with oilsoluble catalysts, as well as emulsifiers. Then the polymerization is effected without further agitation. Polymerization methods of this type are described, for example, in German Published Applications 1,069,387 and 1,301,529.

In general, the work is done as follows. A monomeric dispersion is prepared from the monomer or monomers, the oil-soluble catalyst, the emulsifiers, optionally the protective colloids or buffers as well as water by homogenization. The dispersion is then without further agitation polymerized at temperatures of between 30°C and 80°C, under the autogenic pressure of the monomer (about 1 to 15 atmospheres).

The emulsification prior to polymerization can be attained by various apparatus, for instance, colloid mills, fast-running pumps, vibration agitators, ultrasonic devices, nozzles, and fast-running agitators which hurl the charged mixture onto deflecting surfaces.

Also the copolymerization of vinyl chloride with up to 20% by weight of ethylenically-unsaturated monomers copolymerizable with vinyl chloride is possible. Examples of such monomers are: the vinyl halides, such as vinyl fluoride, vinylidene fluoride, vinylidene chloride, vinyl bromide, vinyl esters of straight-chain or branched alkanoic acids with 2 to 20, preferably 2 to 4, carbon atoms, such as vinyl acetate, vinyl propionate, vinyl butyrate, vinyl 2-ethylhexoate, vinyl versatate ("Versatic" acid is registered trademark of the Shell company for the commercially available mixtures of carboxylic acid, for instance, with 9 to 19 carbon atoms), vinyl isotridecanoic acid esters; vinyl ethers of lower alkanols, unsaturated acids, such as alkenedioic acids, for example, maleic, fumaric, itaconic, crotonic acids, alkenoic acids, for example, acrylic and methacrylic acids, and their mono- or diesters with mono- or dihydric alcohols with 1 to 10 carbon atoms; as well as olefins, such as ethylene, propylene, isobutylene, styrene and acrylonitrile.

As catalysts are of interest oil-soluble freeradical formers in amounts of from 0.01 to 3% by weight, preferably 0.01 to 0.3% by weight, based on monomers, such as diarylperoxides, diacylperoxides, such as diacetyl, acetylbenzoyl, dilauroyl, dibenzoyl, bis-2,4-dichlorobenzoylperoxides, dialkylperoxides, such as di-tertiary-butyl peroxide, peresters, such as tertiary butyl peracetate, tertiary butyl peroctoate, tertiary butyl perpivalate; dialkylperoxydicarbonates, such as diisopropyl-, diethylhexyl-, dicyclohexyl-, diethylcyclohexyl-peroxydicarbonates; mixed anhydrides of organic sulfoperacids and organic acids, such as acetylcyclohexylsulfonylperoxide, as well as azo compounds known as polymerization catalysts, such as azoisobutyric acid dinitrile and boroalkyls. Also mixtures of the named catalysts, such as dialkylpercarbonates and lauroylperoxide or acetylcyclohexylsulfonylperoxide and azoisobutyric acid dinitrile are important.

The emsulfiers may be ionic or non-ionic. They are used in amounts from 0.1 to 5% by weight, preferably 0.3 to 3% by weight, based on the monomers. As ionic emulsifiers preferably anionic-active substances are of interest. Examples for these are alkali and particularly ammonium salts of the fatty acids, such a lauric or palmitic acid, of the acid phosphoric acid alkylesters, such as sodium diethylhexyl phospate, of the acid fatty alcohol sulfuric acid esters, the paraffin sulfonic esters, the alkylnaphthalenesulfonic acids and the sulfosuccinic acid dialkylesters. Very suitable are also alkali and ammonium salts of fatty acids containing epoxy groups, such as ammonium epoxystearate, for instance, the alkali and ammonium salts of the reaction products of peracids, such as peracetic acid with unsaturated fatty acids, for instance, oleic or linoleic acid with formation of perhaps dihyroxystearic acid and hydroxyacetoxystearic acid, as well as the alkali and ammonium salts of the reaction products of peracids with unsaturated hydroxy fatty acids, such as ricinoleic acid, but also cation active emulsifiers such as laurylpyridinium hydrochloride may be used at times.

As examples for the non-ionic emulsifiers may be named partial fatty acid esters of polyhydric alcohols, such as glycerin monostearate, sorbitol monolaurate or palmitate, partial fatty alcohol esters of polycarboxylic acids, polyoxyethylene ethers of fatty alcohols or aromatic hydroxy compounds as well as the known polypropylene oxidepolyethylene oxide condensation products.

Optionally protective colloids, such as polyvinyl alcohol, which may also contain up to 40 mol percent acetyl groups, may further be added, also gelatins and cellulose derivatives, such as water-soluble methylcellulose, carboxymethylcellulose, hydroxyethylcellulose as well as mixed polymerizates of maleic acid or its half esters with styrene.

Also the use of buffers, such as sodium carbonate, sodium bicarbonate, alkali metal acetates, borax, alkali metal phosphates, ammonia or ammonium salts of carboxylic acids, as well as chain length regulators, such as aliphatic aldehydes with 2 to 4 carbon atoms, chlorinated hydrocarbons, such as di- and trichloroethylene, chloroform, methylene chloride, mercaptans, propane and isobutylene is possible. In some cases buffers, for instance, secondary alkali metal phosphates, are also added to the dispersion after it preparation.

Furthermore polymeric diluents can be added to the mixtures of the invention in amounts of 0.5 to 20% by weight, related to the total amount of the mixture, for further improvement of the pore structure and of the physical properties of the foamed articles. In particular 0.5 to 10% by weight, preferably 0.5 to 2.5% by weight, of ethylene-vinyl acetate copolymers with 30 to 60% by weight ethylene, 2 to 20% by weight of vinyl chloridevinyl acetate copolymers, 1 to 10% by weight of acrylonitrile-acrylic acid ester copolymers or graft polymers on the basis of methacrylic acid ester-butadiene-styrene or acrylonitrile-butadiene-styrene can be used. Mixtures of these substances are also suitable.

The mixtures of the invention, therefore, in addition to Components A and B can contain from 0 to 20% by weight of the above polymeric diluents.

In addition, the mixtures of the invention may have added thereto (1) from 0 to 2%, preferably 0.8 to 2%, by weight of conventional lubricants such as waxes, higher molecular weight fatty alcohols, higher fatty acid esters, alkaline earth salts of higher fatty acids, polyethylenes and organopolysiloxanes; (2) from 0 to 3%, preferably 1.5 to 3%, by weight of conventional stabilizers such as tin mercaptides, lead compounds, barium cadmium stabilizers and calcium-zinc stabilizers; (3) from 0 to 0.2% by weight of conventional activators such as zinc oxide or barium stearate; (4) cell size regulators such as "Unifins" or "OT4" (trademarked by the firm Otto Krahn); (5) from 0 to 5% by weight of conventional plasticizers, such as epoxidized soybean oil; and (6) from 0 to 0.5% by weight of dyestuffs. The mixtures are prepared with conventional mixing equipment, such as fluid mixers.

The expanding or foaming agent can be used in solid, liquid or gaseous form. The most common solid expanding agent, azodicarbonamide, is added mostly with an adhesive agent if the mixture is present in granular form, or it is already added during the production of the power mixture on a high-speed mixer. The expanding agent can already be added during the polymerization of the polymers. This results in a particularly fine distribution. The azodicarbonamide is added in amounts of from 0.1 to 5% by weight based on the total weight of the mixture. If liquid expanding agents are used, the gas necessary for the expansion is formed by evaporation of the expanding agents in the processing machine. Furthermore, the expanding agent can also be injected in the form of gas, for example, nitrogen, directly into the plasticized melt in the processing machine.

The processing of the mixtures according to the invention is effected on extruders or according to the injection molding method, and molded parts of excellent quality are obtained. For example, skirtings and covering strips, furniture wall profiles, pipes, facing plates are produced by extrusion. Injection-molded parts are used, for example, in the furniture industry as ornamentations, in drawers, as heater coverings, in radio and television engineering as loudspeaker boxes, front plates, chassis for record players; in the packing industry for boxes of all types, cable drums, water tanks, cooling and insulating containers, tool chests; in the automotive industry as fan housings, battery boxes, sun visors; in the building industry as coverings, casing elements and roof tiles. Heels, brush bodies, toilet covers and seats, shoe lasts, flower pots and dishes can also be produced by injection molding with the foamable PVC mixtures of the invention.

The following examples are illustrative of the practice of the invention without being deemed limitative in any respect.

EXAMPLE 1

A foamable mixture was prepared from the following components:

| | Parts by Weight |
|---|---|
| Emulsion polymerized polyvinyl chloride "Vinnol E 60G" (Wacker-Chemie) | 90 |
| Addition according to the invention of the special prehomogenized polyvinylchloride "Vinnol P 68E" (Wacker-Chemie) | 10 |
| Tin mercaptide | 3 |
| Glycerin fatty acid ester | 0.5 |
| "Hoeschst Wax E" (polyethylene) | 0.5 |
| Zinc oxide | 0.1 |
| Barium stearate | 0.1 |
| Epoxidized soybean oil | 4 |
| Azodicarbonamide | 2 |

This mixture was processed both on an extruder and on an injection molding machine. The molded parts obtained were satisfactory. They had a density of 0.434 gm/cc (extrusion) and 0.625 gm/cc (injection molded). "Vinnol E 60G" is a coarse grained emulsion-polymerized polyvinyl chloride homopolymerizate having a K-value of 59–61. "Vinnol P 68E" is a specially prehomogenized emulsion-polymerized polyvinyl chloride homopolymerizate with a K-value of 68.

EXAMPLE 2

The same formula as in Example 1, but without the addition of P 68E and with 100 parts of "Vinnol E60G" instead, yielded molded parts with a density of 0.674 gm/cc (extrusion).

EXAMPLE 3 (Comparision)

The same formulas as in Example 1, but instead of the addition of P68E according to the invention, with 10 parts "VH 10/60" (copolymer of 90% by weight vinyl chloride and 10% by weight vinyl acetate having a K-value of 60 to 61 [Wacker-Chemie]), yielded a density of 0.555 gm/cc (extrusion).

EXAMPLE 4

When using suspension polymerized polyvinyl chloride "Vinnol H60D" (Wacker-Chemie) instead of emulsion polymerized polyvinyl chloride in the formula of Example 1, a density of 0.531 gm/cc was obtained. Without the addition of the prehomogenized polyvinyl chloride according to the invention the density was 0.756 gm/cc. "Vinnol H 60D" is a suspension polymerized polyvinyl chloride homopolymerizate with a K-value of about 60.

EXAMPLE 5

In the formula according to Example 1, bulk polymerized polyvinyl chloride "Vinnol Y61M" (Wacker-Chemie) was used instead of emulsion polymerized polyvinyl chloride. Molded bodies with densities of 0.552 gm/cc were obtained. Without the addition of P68E, the densities were 0.768 gm/cc. "Vinnol Y 61M" is a free-flowing bulk-polymerized polyvinyl chloride homopolymerizate with a K-value of 60 to 62.

EXAMPLE 6

To the components obtained in Examples 1, 4 and 5 were added in additional tests the following components:

a. 1 part of "VAE 611" (Wacker-Chemie, copolymer of 60% vinyl acetate and 40% ethylene) or b. 1 part of "Novodur P25" (Farbwerke Bayer, acrylonitrile-butadiene-sytrene resin) or c. 1 part of "K 120 N" (Rohm & Haas, acrylonitrile-acrylic acid ester resin).

No change in the densities of the foamed molded bodies was found with any of the new formulas. But improvements of the rheological properties were found which can be of importance in complicated profiles.

EXAMPLE 7

In the formulas of Examples 1, 4 and 5 the polymer components were changed as follows:
80 parts polyvinyl chloride (E60G, H60D, Y61M)
10 parts P68E (Wacker-Chemie)
10 parts "VH 10/60" (copolymer of vinyl chloride and vinyl acetate, 10% by weight [Wacker-Chemie]).

The densities of the foamed molded bodies were hardly changed by the addition of "VH 10/60". The rheological properties showed slight improvements.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. Thermoplastic mixtures suitable for foaming in the extrusion or injection molding process consisting of polymerizate mixtures of (A) from 50 to 95% by weight of a vinyl chloride polymerizate prepared by free-radical polymerization selected from the group consisting of (1) bulk polymerization and (2) emulsion and suspension polymerizations with continuous agitation, of vinyl chloride containing up to 20% by weight of ethylenically-unsaturated monomers copolymerizable with vinyl chloride and (B) from 5 to 50% by weight of a vinyl chloride polymerizate prepared by polymerization without further agitation of a stable, aqueous monomeric dispersion of vinyl chloride containing up to 20% by weight of ethylenically-unsaturated monomers copolymerizable with vinyl chloride prehomogenized in the presence of emulsifiers and oil-soluble catalysts, and from 0.1 to 5% by weight of said thermoplastic mixtures of azodicarbonamide as a foaming agent, said thermoplastic mixtures also having from 0 to 20% by weight of polymeric diluents, from 0 to 2% by weight of lubricants, 0 to 3% by weight of stabilizers, 0 to 0.2% by weight of activators and cell-size regulators, 0 to 5% by weight of plasticizers and from 0 to 0.5% by weight of dyestuffs.

2. The thermoplastic mixture of claim 1 having a further content of from 0.5 to 10% by weight, based on the total weight of the mixture, of an ethylene-vinyl acetate copolymer containing from 30 to 60% by weight of ethylene as said polymeric diluent.

3. The thermoplastic mixture of claim 2 wherein said ethylene-vinyl acetate copolymer is present in an amount of from 0.5 to 2.5% by weight, based on the total weight of the mixture.

4. The thermoplastic mixture of claim 1 having a further content of from 2 to 20% by weight, based on the total weight of the mixture, of vinyl chloride-vinyl acetate copolymer as said polymeric diluent.

5. The thermoplastic mixture of claim 1 having a further content of from 1 to 10% by weight, based on the total weight of the mixture, of an acrylic resin selected from the group consisting of acrylonitrileacrylic acid ester copolymers, butadiene-styrene copolymers grafted with a methacrylic acid ester and butadienestyrene copolymers grafted with acrylonitrile as said polymeric diluent.

* * * * *